United States Patent [19]

Hughes

[11] Patent Number: 5,786,032
[45] Date of Patent: Jul. 28, 1998

[54] COATING COMPOSITION AND PROCESS FOR PRODUCING COATED ARTICLES

[75] Inventor: Frank J. Hughes, Edina, Minn.

[73] Assignee: Vision-Ease Lens, Inc., Brooklyn Center, Minn.

[21] Appl. No.: 361,880

[22] Filed: Dec. 22, 1994

Related U.S. Application Data

[63] Continuation of Ser. No. 95,791, Jul. 22, 1993, abandoned, which is a continuation-in-part of Ser. No. 796,007, Nov. 22, 1991, abandoned.

[51] Int. Cl.$^6$ .................................................. B05D 3/02
[52] U.S. Cl. ....................... 427/387; 528/27; 528/38; 106/287.11; 428/447
[58] Field of Search .................. 528/27, 38; 427/387; 106/287.11; 428/447

[56] References Cited

U.S. PATENT DOCUMENTS

| | | | |
|---|---|---|---|
| 3,166,527 | 1/1965 | Ender | 260/33.2 |
| 3,837,876 | 9/1974 | Mayuzumi et al. | 106/287 |
| 3,961,977 | 6/1976 | Koda et al. | 106/287 |
| 3,986,997 | 10/1976 | Clark | 260/29.2 |
| 4,006,271 | 2/1977 | French et al. | 427/164 |
| 4,027,073 | 5/1977 | Clark | 428/412 |
| 4,042,769 | 8/1977 | Lynch | 526/106 |
| 4,081,421 | 3/1978 | Yoshida | 528/27 |
| 4,196,014 | 4/1980 | Taniyama et al. | 106/287 |
| 4,241,116 | 12/1980 | Taniyama et al. | 427/386 |
| 4,378,250 | 3/1983 | Treadway et al. | 106/287 |
| 4,472,464 | 9/1984 | Haluska et al. | 427/387 |
| 4,619,949 | 10/1986 | Kistner | 522/170 |
| 4,800,122 | 1/1989 | Sallavanti et al. | 428/412 |

FOREIGN PATENT DOCUMENTS

| | | |
|---|---|---|
| 54-129099 | 10/1979 | Japan . |
| 54-129098 | 10/1986 | Japan . |
| 62-212481 | 9/1987 | Japan . |

*Primary Examiner*—Margaret W. Glass
*Attorney, Agent, or Firm*—Kinney & Lange, P.A.

[57] ABSTRACT

An improved composition for producing a scratch-resistant coating for a plastic object together with the process of making and applying the coating is herein disclosed. Included in the composition is a mixture of a nonsilane organic epoxy compound and a partially hydrolyzed aminosilane reacted with a carbonyl-containing compound in an organic solvent. The mixture is applied to a plastic surface which is then heated to cure the coating into a hard transparent film which can be tinted quickly and darkly with an organic dye.

16 Claims, No Drawings

5,786,032

COATING COMPOSITION AND PROCESS FOR PRODUCING COATED ARTICLES

RELATED U.S. APPLICATION DATA

This is a file-wrapper continuation of application Ser. No. 08/095,791, filed Jul. 22, 1993 now abandoned which is a Continuation-In-Part of application Ser. No. 07/796,007 filed Nov. 22, 1991, abandoned.

BACKGROUND OF THE INVENTION

The present invention relates generally to coating compositions, and more particularly, to polyorganosiloxane compositions forming mar-resistant coatings on substrates.

A variety of substrates, including those made of glass, plastic, metal, or concrete, are usefully coated with protective films. It is generally desirable that protective film coatings have good weathering properties, adhesion, and resistance to thermal and mechanical shock, heat, humidity, and common chemicals. It is also desirable that the film coatings be practical to apply, dry, and cure. These properties are more difficult to achieve when the protective film coating is applied to plastic substrates than when applied to many other substrates.

Some plastics substrates are desirable substitutes for glass due to a lighter weight than glass, economically advantageous fabrications, and breakage resistance. However, commercially available plastic substrates tend to have a reduced resistance to abrasion, marring, and scratching when compared to glass. Thus, protective film coatings for plastic substrates are of particular interest.

Several technical approaches have been attempted in an effort to coat plastic substrates in order to improve resistance to abrasion, marring and scratching of the plastic substrates. In particular, work has been carried out to develop coatings of polyorganosiloxanes cross-linked by a condensation of silanol groups.

The Mayasumi patent, U.S. Pat. No. 3,837,876, described a reaction of aminosilane with epoxysilane to produce a substance dissolvable in a solvent. Once dissolved, the substance was applied to various substrates to coat the substrates.

The Ender patent, U.S. Pat. No. 3,166,527, described mixing epoxysilane with aminosilane to make an unpolymerized mixture and a polymerized mixture. Each of the mixtures was applied to a surface to coat the surface. The coating made by each mixture was cured either by standing at room temperature or by heating.

The Koda patent, U.S. Pat. No. 3,961,977, described a use of aminoalkoxysilane hydrolyzed within a range of 10–40% of hydroxyl groups and epoxyalkoxysilane to make a coating mixture. The hydrolyzed aminoalkoxysilane and epoxyalkoxysilane were dissolved in a solvent. Solvents described included a ketone.

The Treadway et al. patent, U.S. Pat. No. 4,378,250, described a use of ketones or aldehydes in making a coating. In particular, the Treadway et al. patent described increasing the hydrolysis of at least two different silane materials to above 40% to make a reaction mixture. The Treadway et al. patent also described adding the ketone to the reaction mixture to form a ketimine.

SUMMARY OF THE INVENTION

The present invention includes an abrasion-resistant coating that adheres well to the substrate and is clear, transparent, colorless, and free of visible specs. The coating is also highly tintable and is strongly adherent to the substrate even after tinting or exposure to heat and humidity.

The coating composition includes a solvent, an epoxy prepolymer, and a partially hydrolyzed aminosilane that is effectively blocked from reacting with the epoxy prepolymer at ambient temperature. The coating composition is applied to the substrate and then treated to remove the block from the hydrolyzable aminosilane such that the aminosilane and the epoxy prepolymer react to form an abrasion-resistant coating.

DETAILED DESCRIPTION OF THE PREFERRED EMBODIMENTS

The present invention includes a coating composition that includes a solvent, a nonsilane epoxy prepolymer that undergoes epoxy polymerization, and a partially hydrolyzable aminosilane that is effectively blocked from reacting with the epoxy prepolymer at ambient temperature to provide an exceptionally durable coating that is cross-linked by silanol condensation. The present invention also includes a method for making a coating cross-linked by silanol condensation that includes partially hydrolyzing an aminosilane to a degree that is greater than 10% of complete molar reaction, mixing the partially hydrolyzed aminosilane with an agent blocking epoxy polymerization such as a ketone or an aldehyde to form a ketimine thereby blocking later epoxy polymerization until desired by heating, adding a non-silane epoxy prepolymer to the ketimine to form a mixture, partially polymerizing the mixture by heating to provide body to the mixture, adding a solvent to provide to the polymerized mixture a proper viscosity for coating, and adding a surfactant to provide uniform coating characteristics.

The coating composition of the present invention is suitable for coating plastic substrates such as ophthalmic lenses. In particular, the coating composition provides an abrasion-resistant and mar-resistant coating for polycarbonate ophthalmic lenses.

The coating composition of the present invention is tintable. The coating composition may be used to formulate a coating for a substrate such as an ophthalmic lens which tints many times darker than coatings with compositions having two or more different silanes. A presence of two different silanes is believed to render the composition of the coating ponderous. Also, the composition having two or more different silanes has a limited dye tintability range obtainable by varying the ratio of epoxy to amino groups within the bounds of allowable abrasion resistance.

The method of the present invention is usable to provide a tintable coating for substrates such as ophthalmic lenses. In particular, the method may further include steps of coating a substrate with the coating composition and contacting the coating with a dye to impart a tint to the coating. The method has an increased versatility and efficiency for tinting lenses over methods presently available. A wide range of tint values and shorter tinting times with tinting baths may be produced by suitable variations of the proportions of epoxy and aminosilane components of the composition of the present invention.

Suitable epoxies usable in the composition of the present invention include compounds of the general formula:

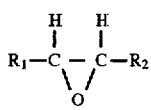

where $R_1$ and $R_2$ include hydrogen, alkyl, aryl, alkoxy, alkoxyalkyl, alkoxyaryl, or other relatively stable organic moieties. Diepoxy, triepoxy, or polyepoxy compounds with the epoxies separated by alkyl, etheric, or alkyletheric linkages may also be used.

Suitable aminosilanes include compounds having the general formula:

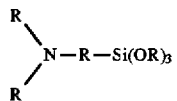

where the R can be any stable mix or combination at the various positions of alkyl, alkoxy, alkyl ether, alkylamino or other combination of carbon and hetero atoms. One particularly preferred component, due to availability and price, is gamma-aminopropyltriethoxysilane.

Suitable solvents in the coating composition include alcohols, aldehydes, ketones, glycol ethers, and esters. One preferred solvent is a mixture of methyl ethyl ketones and ethyl alcohol. The particular step at which solvent is added in the method of making the composition is not critical. It is convenient, however, to add a chilled solvent to quench the prepolymerization reaction.

In one embodiment, the composition preferably also includes a surfactant, used as a flow-controlling agent for regulating film thickness and enhancing the cosmetic appearance of the coated article. One commonly available surfactant is FLUORAD FC-430®, available from 3M Corporation of St. Paul, Minn.

When the coating is applied to a substrate, the coating can be polymerized and hardened in an oven which has access to normally humid air. The heat and moisture remove the blocking agent so that epoxy polymerization which is catalyzed by the amine can take place.

The examples set forth below are intended for illustrative purposes and should not be construed as limiting the invention in any way.

EXAMPLE 1

1,000 grams of gamma-propylaminotriethoxysilane was added to 150 grams of water ($H_2O$) to form a mixture which was heated to 35° C. and stirred for an hour. The temperature of the mixture reached approximately 80° C. The resultant solution was allowed to stand for at least two hours. This will be called Solution A.

A quantity of cyclohexane dimethanol diglycidyl ether was set aside and will be called Solution B.

A quantity of 100 grams of FC-430® surfactant, manufactured by 3M of St. Paul, Minn., were dissolved in 900 grams of methyl ethyl ketone and labeled Solution C.

EXAMPLE 2

A quantity of 1,000 grams of solution A were added to 256 grams of solution B to form a mixture. The mixture was heated with stirring to 53° C. and components were allowed to react for 10 minutes. The mixture was then quenched with a quenching mixture of 1,500 grams of methyl ethyl ketone, 64 grams Solution C and 570 grams ethyl alcohol. The quenched mixture was cooled down to 10° C. Polycarbonate lenses were dip coated with the cooled mixture, held at 65.6° C. for 20 minutes, and cured for 4 hours in an oven at 121.1° C.

Adhesion was tested by ASTM D3359. Abrasion was tested by 5 strokes of a steel wool mass weighted with a 32-ounce weight. If no scratches are observed, the coating passed. The lenses were tested for adhesion and abrasion. The lenses displayed acceptable adhesion and abrasion. The lenses were dyed for five minutes in BPI black and were found to have a total light transmission of 3%.

EXAMPLE 3

A quantity of 550 grams of solution A were added to 225 grams of solution B to make a mixture. The mixture was heated to 52° C. and components of the mixture were allowed to react for 5 minutes. The mixture was then quenched with a mixture of 650 grams of methyl ethyl ketone, 11 grams of solution C, and 81 grams of ethyl alcohol. The quenched mixture was cooled down to 10° C.

Polycarbonate lenses were dip coated with the mixture, held at 65.6° C. for 20 minutes, and cured for 4 hours in an oven at 121.1° C. The lenses passed the adhesion and abrasion tests and were tinted for various times with BPI black dye. The degree of tinting that occurred with tinting time is described as follows:

| Tint time, minutes | Total light transmission, % |
| --- | --- |
| 5 | 2.2 |
| 3 | 11.2 |
| 2 | 26.1 |
| 1 | 43.3 |

EXAMPLE 4

The conditions of Example 3 were repeated except that 500 grams of solution A and 500 grams solution B were subjected to different prepolymerization times at 52° C. The different prepolymerization times are listed below. Variations in total light transmission at 3 minute dye immersion is shown below.

| Prepolymerization time, minutes | Total light transmission, % |
| --- | --- |
| 6 | 17.0 |
| 8 | 20.5 |
| 10 | 27.0 |

COMPARATIVE EXAMPLE 1

A coating solution prepared using equimolar amounts of the epoxysilane and the amino silane. Lenses coated with this composition and cured at 121.1° C. for 4 hours exhibited 58% total light transmission.

What is claimed is:

1. A method for making a tintable and abrasion resistant coating that is cross-linked by silanol condensation and epoxy polymerization, the method comprising:

partially hydrolyzing an aminosilane having hydrolyzable groups to form an amino silane hydrolyzate;

adding a non-silane epoxy prepolymer to the aminosilane hydrozylate to form a first mixture;

partially polymerizing the first mixture to form a second mixture;

adding a solvent to the second mixture to form a third mixture;

applying the third mixture to a substrate and curing the third mixture on the substrate to make the tintable and abrasion resistant coating.

2. The method of claim 1 wherein the first mixture consists essentially of:

the aminosilane hydrozylate; and the non-silane epoxy prepolymer.

3. The method of claim 1 wherein the second mixture consists essentially of a partial polymerizate of the aminosilane hydrozylate and the non-silane epoxy prepolymer.

4. The method of claim 1, the method further comprising mixing the partially hydrolyzed aminosilane with a blocking agent to prevent the aminosilane from reacting with epoxy groups upon formation of the first mixture.

5. The method of claim 4 wherein the blocking agent comprises an aldehyde or a ketone.

6. The method of claim 5 wherein the blocking agent comprises methyl ethyl ketone.

7. The method of claim 1 wherein applying the third mixture to the substrate consists of dipping the substrate in the third mixture.

8. A coating made in accordance with the method of claim 1.

9. The method of claim 1 wherein the third mixture comprises a small amount of a surfactant.

10. A method for producing a coating for a substrate, the method comprising:

partially hydrolyzing an aminosilane having hydrolyzable groups to form an aminosilane hydrolyzate;

blocking the aminosilane hydrolyzate from reacting with an epoxy at ambient temperature;

adding a nonsilane epoxy prepolymer to the blocked aminosilane hydrolyzate to form a first mixture;

unblocking the blocked aminosilane hydrozylate to permit polymerization of the first mixture and formation of a second mixture; and quenching the second mixture to prevent full polymerization of the non-silane epoxy prepolymer and the aminosilane hydrozylate.

11. The method of claim 10 wherein unblocking of the blocked aminosilane hydrozylate to permit polymerization comprises heating the first mixture.

12. The method of claim 10 the method further comprising applying the quenched second mixture to the substrate.

13. The method of claim 10 wherein applying the quenched second mixture to the substrate consists of dipping the substrate in the quenched second mixture.

14. The method of claim 10, the method further comprising curing the quenched second mixture on the substrate.

15. The method of claim 10, the method further comprising applying the quenched second mixture onto a polycarbonate surface of the substrate.

16. A coating made in accordance with the method of claim 10.

* * * * *